United States Patent
Agee et al.

(10) Patent No.: US 11,947,905 B1
(45) Date of Patent: Apr. 2, 2024

(54) TEMPLATE BUILDER FOR DYNAMICALLY GENERATED EXECUTABLES

(71) Applicant: VALIDATAR, LLC, Irving, TX (US)

(72) Inventors: Jonathan M. Agee, Carrollton, TX (US); Darrell Ray Zook, Lewisville, TX (US); Antony C. Nguyen, Mansfield, TX (US)

(73) Assignee: VALIDATAR, LLC, Irving, TX (US)

( * ) Notice: Subject to any disclaimer, the term of this patent is extended or adjusted under 35 U.S.C. 154(b) by 0 days.

(21) Appl. No.: 17/935,910

(22) Filed: Sep. 27, 2022

(51) Int. Cl.
*G06F 40/186* (2020.01)
*G06F 11/36* (2006.01)
*G06F 16/242* (2019.01)
*G06F 16/2455* (2019.01)
*G06F 16/2457* (2019.01)

(52) U.S. Cl.
CPC ........ *G06F 40/186* (2020.01); *G06F 11/3684* (2013.01); *G06F 16/242* (2019.01); *G06F 16/24565* (2019.01); *G06F 16/24573* (2019.01)

(58) Field of Classification Search
None
See application file for complete search history.

(56) References Cited

U.S. PATENT DOCUMENTS

| | | | | |
|---|---|---|---|---|
| 9,529,788 B1* | 12/2016 | Gupta | ................... | G06F 40/186 |
| 10,628,294 B2* | 4/2020 | Datta | ................... | G06F 11/3696 |
| 10,931,558 B2* | 2/2021 | Nallavalli | ............... | H04L 43/50 |
| 2011/0106554 A1* | 5/2011 | Benja-Athon | ......... | G06Q 40/08 |
| | | | | 705/2 |
| 2011/0173019 A1* | 7/2011 | Benja-Athon | ......... | G16H 10/20 |
| | | | | 705/2 |
| 2016/0092347 A1* | 3/2016 | Edwards | ............. | G06F 11/3684 |
| | | | | 717/125 |
| 2018/0276111 A1* | 9/2018 | Datta | ................... | G06F 11/3664 |
| 2022/0365873 A1* | 11/2022 | Agee | ................... | G06F 11/3676 |

* cited by examiner

Primary Examiner — Kim T Nguyen
(74) Attorney, Agent, or Firm — Foley IP Law, PLLC (57) ABSTRACT

A template builder for dynamically generated executables intakes objects from a metadata repository and template components from a template component library. An interface receives user selections of a test data object from among the objects in the metadata repository and template component from among the template components in the template component library. The template builder builds a candidate script template with the selected template component(s) and customizes the candidate script template, using the selected test data object into a generated script preview. The interface displays the generated script preview, and upon execution of the generated script preview, displays results of the execution. If the user is satisfied, the candidate script template may be persisted and used in templated data tests or other templated computational tasks.

20 Claims, 9 Drawing Sheets

TEMPLATE BUILDER FOR DYNAMICALLY GENERATED EXECUTABLES

BACKGROUND

Working efficiently with data requires data engineering teams to generate massive numbers of complex scripts for all types of processes including but not limited to the following: extracting data, moving or copying data, creating/modifying/deleting data structures, transforming data, testing data, visualizing and reporting on data, sharing data. While some of these processes require completely custom scripts for each step, most processes are highly pattern based and can be generated from a template that allows for efficiency, repeatability, and standardization. This template-based approach is critical because data sets and environments can have thousands of objects (databases, schemas, tables, columns, files, users, roles, etc.) and generating each script individually would be cost prohibitive and unreliable.

While many data management tools allow for the use of templates to generate the scripts used in data processes, the creation and modification of templates is a challenging process that requires highly specialized skills and is made difficult by the lack of tools to rapidly prototype and test the templates to see if they are working as designed. This leaves users of data management tools that can use templates to either make do with the limited set of templates that are provided with the tool or to try to create new templates through a long and challenging process of trial and error that is inefficient and can only be done by a limited number of experts in the tool.

SUMMARY

The following summary is provided to illustrate examples disclosed herein, but is not meant to limit all examples to any particular configuration or sequence of operations.

A disclosed method of generating a script template comprises: receiving an indication of objects in a metadata repository; receiving an indication of template components in a template component library; receiving, through an interface, a selection of a data object from among the objects in the metadata repository; receiving, through the interface, a selection of one or more template components from among the template components in the template component library; building a candidate script template with the selected template components, as well as additional text input through the interface; customizing the candidate script template to the selected data object into a generated script preview; displaying, in the interface, the generated script preview; executing the generated script preview; displaying, in the interface, results of the execution of the generated script preview; and persisting the candidate script template as an output script template.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A template builder for the creation of script templates intakes objects from a metadata repository and template components from a template component library. An interface receives user selections of a data object from among the objects in the metadata repository and one or more template components from among the template components in the template component library and user input code via text entry to generate a candidate script template. The template builder customizes the candidate script template, using the selected data object into a generated script. The interface displays the generated script for the user to preview, and upon execution of the generated script, displays results of the execution. If the user is satisfied, the candidate script template may be persisted and used in templated data tasks or other templated computational tasks.

Templated data tasks may be used for a wide variety of processes in working with data. Examples include generating code to extract data from one system and load it into another, generating code to manage the structure of objects in a database or data environment, generating code to move and transform data inside of a system, and generating code to test that requirements are accurately represented in either the structure or data resulting from other processes. Aspects of the disclosure may be advantageously included in systems that are specifically designed for any number of data management processes to facilitate the rapid development, validation, and deployment of templates that previously were difficult to create and required specialized expertise. These templates may be applied in multiple various scenarios and to a wide range of data objects, including databases, schemas, tables, column, views, functions, stored procedures, code modules, users, roles, files, security rules, cloud computing configuration scripts, etc.

In some more specific scenarios, templated data tests may be used to manage data tests in a repeatable way without having to manually write the data tests anew each time. This advantageously enables scalability for large numbers of large data-centric projects. One example type of data test is comparing data in different manifestations (e.g., a legacy data warehouse and a cloud storage solution) to ensure completeness. Other example types of data test are comparing data values against range limits (e.g., is the data within a certain numeric range?) or expected statistical limits (e.g., averages), ensuring a certain number of columns and/or rows are present in a table; ensuring data fields are populated, and determining whether the data type (e.g., numeric, character, or other type) is proper.

Each of these testing scenarios requires a specific template to be created with special syntax for the specific environment in which it is executed. Prior to the advent of the capabilities provided by the disclosed solutions, users were unable to create needed templates for common large-scale data stores, for the relevant scenarios. Thus, the disclosure enables data testers to conceive, create, test and implement a test for any one of the above scenarios quickly and efficiently.

Various use cases demonstrate the practical usefulness of the disclosure. One use case involves a data engineer being tasked with creating a process for ingesting thousands of incoming files into a database. Each file has its own structure and nuances. In many data management tools, only a limited set of options is available to generate the required scripts to process each file. Using the disclosure, the data engineer is able to create, test, and implement new metadata-driven templates for processing and managing the large volume of incoming files.

In another use case, the data engineer employs a tool to generate tables and structured query language (SQL) code to populate the tables with data. The data engineer may have templates that will work for a different database engine, but not the database engine currently in use. For example, the SQL syntax may be different and incompatible. In this use case, there is a need to modify the templates to adjust the SQL syntax to the syntax required for the database engine in use. Aspects of the disclosure advantageously permit the data engineer to modify the existing templates, and test the updated functionality on a sample of actual data, to ensure the adjustments function prior to deployment.

In another use case, a data engineering team is tasked with implementing scripts that monitor the contents of a large database that includes a significant number of tables and columns. The customers (e.g., users of the database), who are not code developers, independently provide input as to which of the tables and columns require monitoring. However, such customers are unlikely to have the skill necessary to provide the needed input. Using the disclosure, the customers are able to update business metadata, including information such as format indicators for the type of data that is expected in a particular column, limits and thresholds for data values, relationships and references between columns and tables, and other relational criteria. The business metadata is then useful for the data engineering team to leverage for creating templates that generate queries and scripts to check each of the scenarios according to the requirements of the customers. Using aspects of the disclosure thus enhances the efficiency of the data engineering team.

This approach permits for example, a set of thousands of processing tasks to be changed with a few selections of metadata values by a template execution tool. This requires mere seconds, rather than hours or days for a user to test or otherwise process voluminous data sets. Further, once a set of script templates are shown to work reliably for one project, that set of script templates may be rapidly leveraged for other projects, by obtaining and applying the proper metadata.

Figure 1:
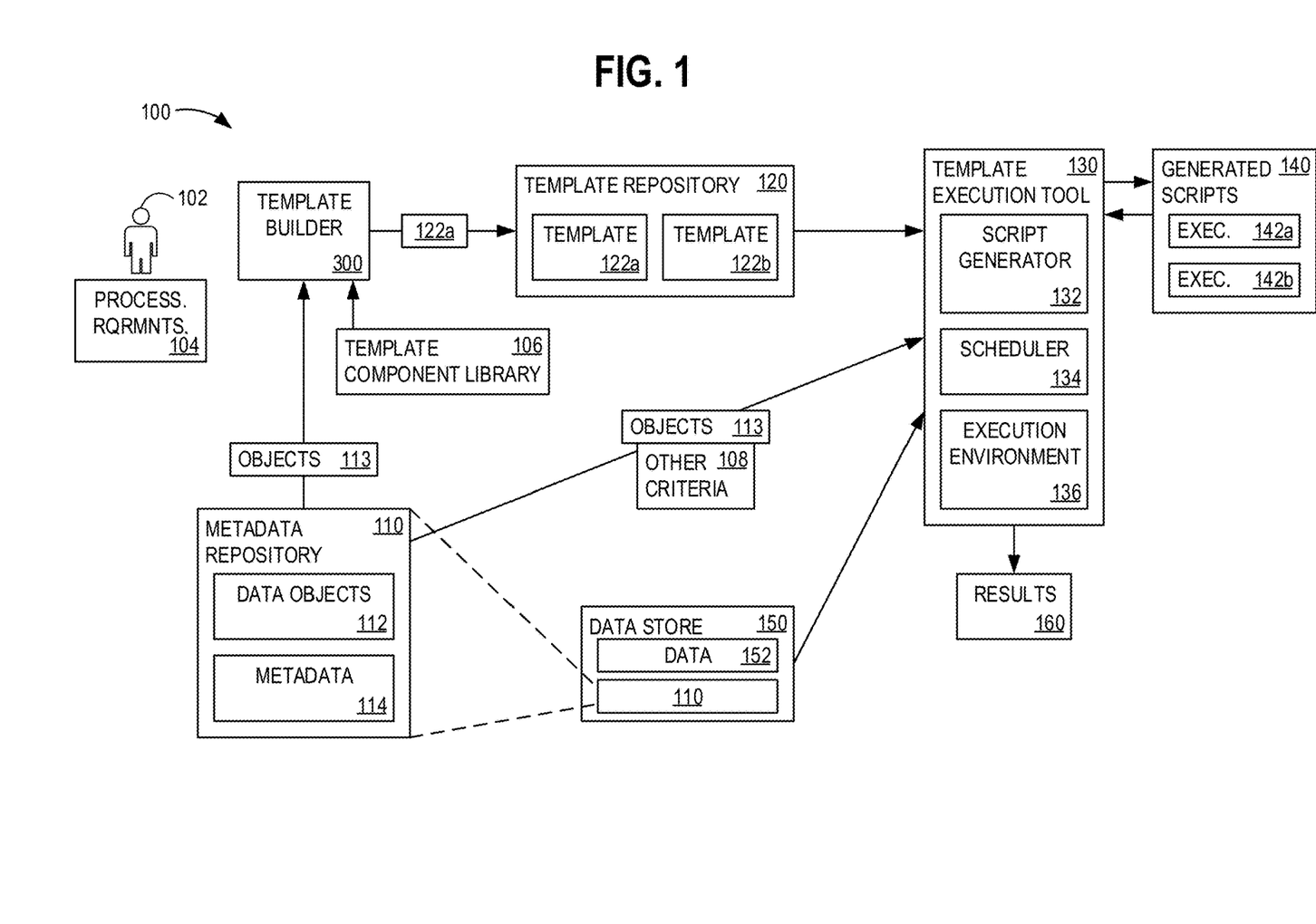
FIG. 1 illustrates an exemplary arrangement that advantageously includes an example template builder for dynamically generated executables.

FIG. 1 illustrates an exemplary arrangement 100 that advantageously includes an example template builder 300 for rapid development of script templates which are persisted into the template repository 120. Arrangement 100 alleviates the need for experienced code developers to produce custom script templates. A template execution tool 130 intakes one or more script templates (e.g., script template 122*a* and script template 122*b*) and objects 113, which may be selected with any number of criteria 108 based on metadata 114 and data objects 112 in the metadata repository 110, from data objects 112 and metadata 114, from metadata repository 110 and generates generated scripts 140 (e.g., generated script 142*a* and generated script 142*b*) using a script generator 132.

A script template is a template with placeholders that may be substituted with actual metadata values (stored in a library), in order to generate a large volume (e.g., thousands or more) executable scripts. For example, script template 122*a* and 122*b* each include variables or metadata references that are customized by script generator 132 for various processing tasks using objects 113. Objects 113 includes data objects 112 and metadata 114, which includes technical metadata 116 and business metadata 118. Script generator 132 is a program element that intakes script templates and replaces the placeholders with selected ones of objects 113 to produce generated scripts 140.

An execution environment 136 is a script execution tool that executes generated scripts 140, in some examples under the control of a scheduler 134, and outputs (reports) results 160 of the executions of generated scripts 140. The executions of generated scripts will operate on various data in data store 150 to accomplish the desired outcomes, such as data validation tasks. In some examples, scheduler 134 runs scheduled (e.g., daily, weekly) tests on data, to ensure the integrity of data store 150. User 102 uses results 160 to monitor the integrity or other status of data store 150, or for other computational goals.

Template builder 300 receives input from user 102 to generate script templates 122*a* and 122*b*. User 102 references processing requirements 104, such as design specifications, when using template builder 300. To facilitate the creation of script templates 122*a* and 122*b*, and reduce the coding skill level required for building a set of script templates, a template component library 106 is provided. Template component library 106 contains samples of code that may be used with a drag-and-drop or other selection operation. This enlarges the set of people who are able to produce script templates and reduces the need for users of large-scale template-based data management solutions to hire potentially expensive expert coders.

Figure 2A:
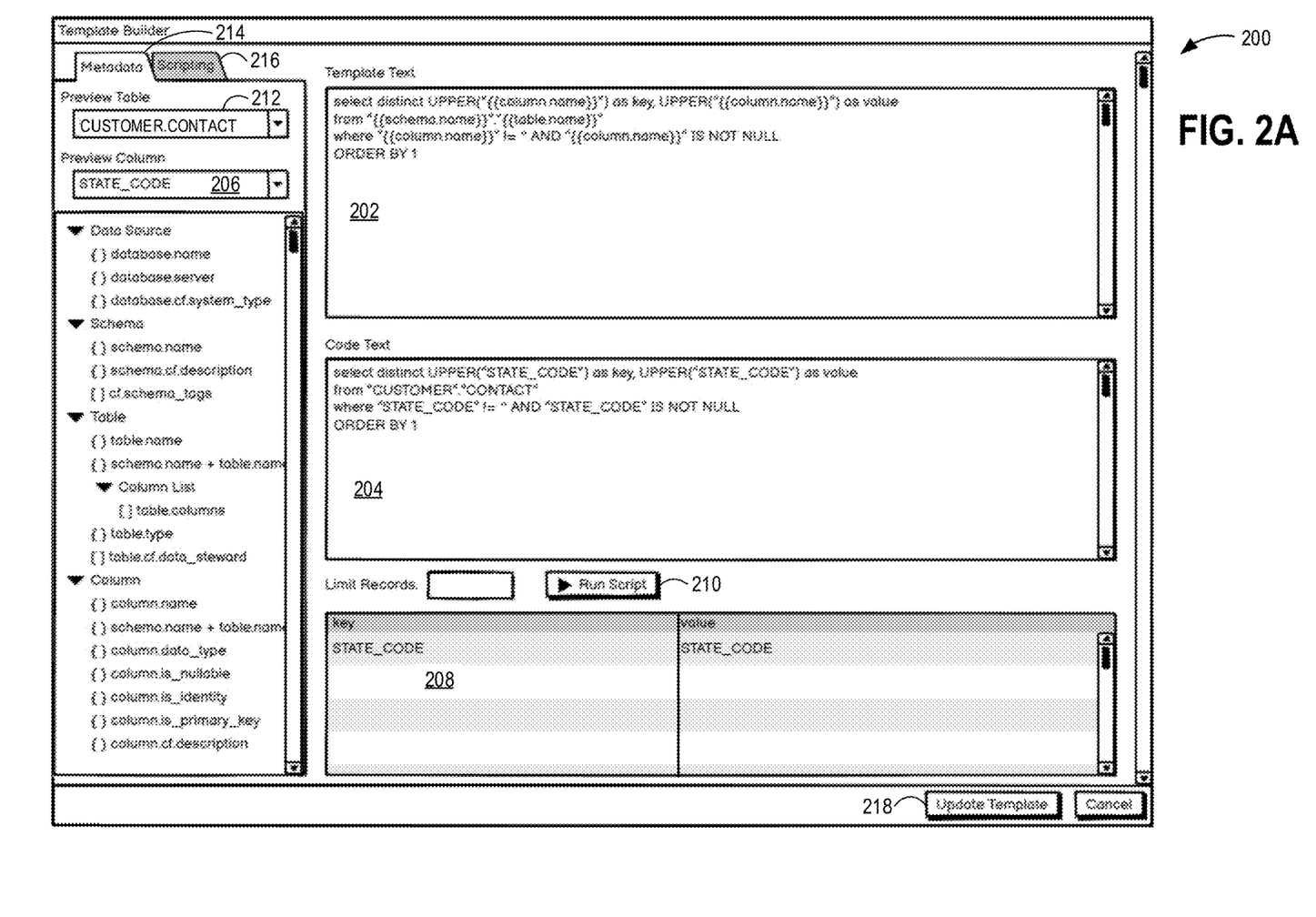
FIG. 2A illustrates an exemplary interface for the template builder of FIG. 1.
Figure 2B:
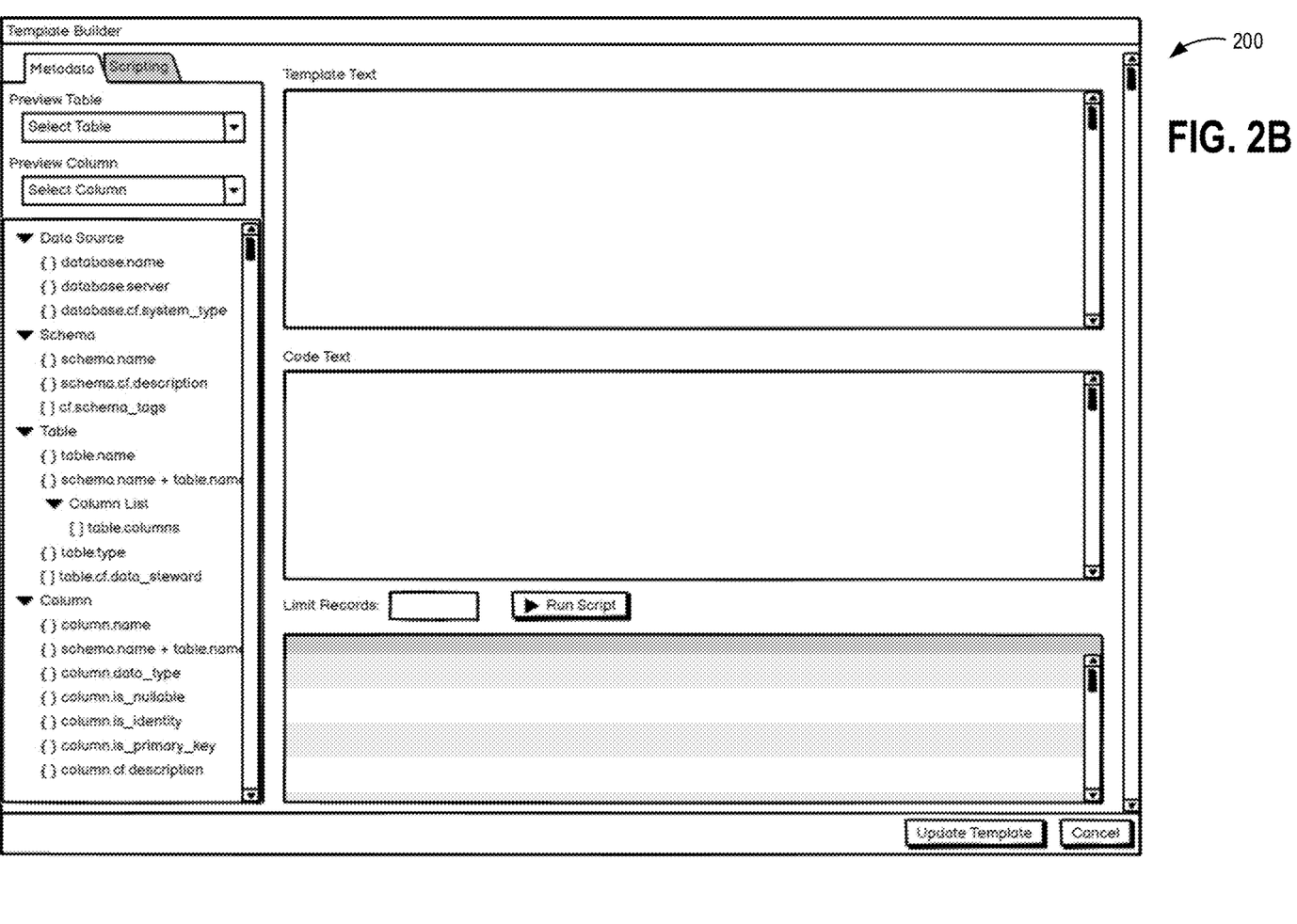
FIGS. 2B and 2C illustrate clean versions of the interface of FIG. 2A with minimal annotation.
Figure 2C:
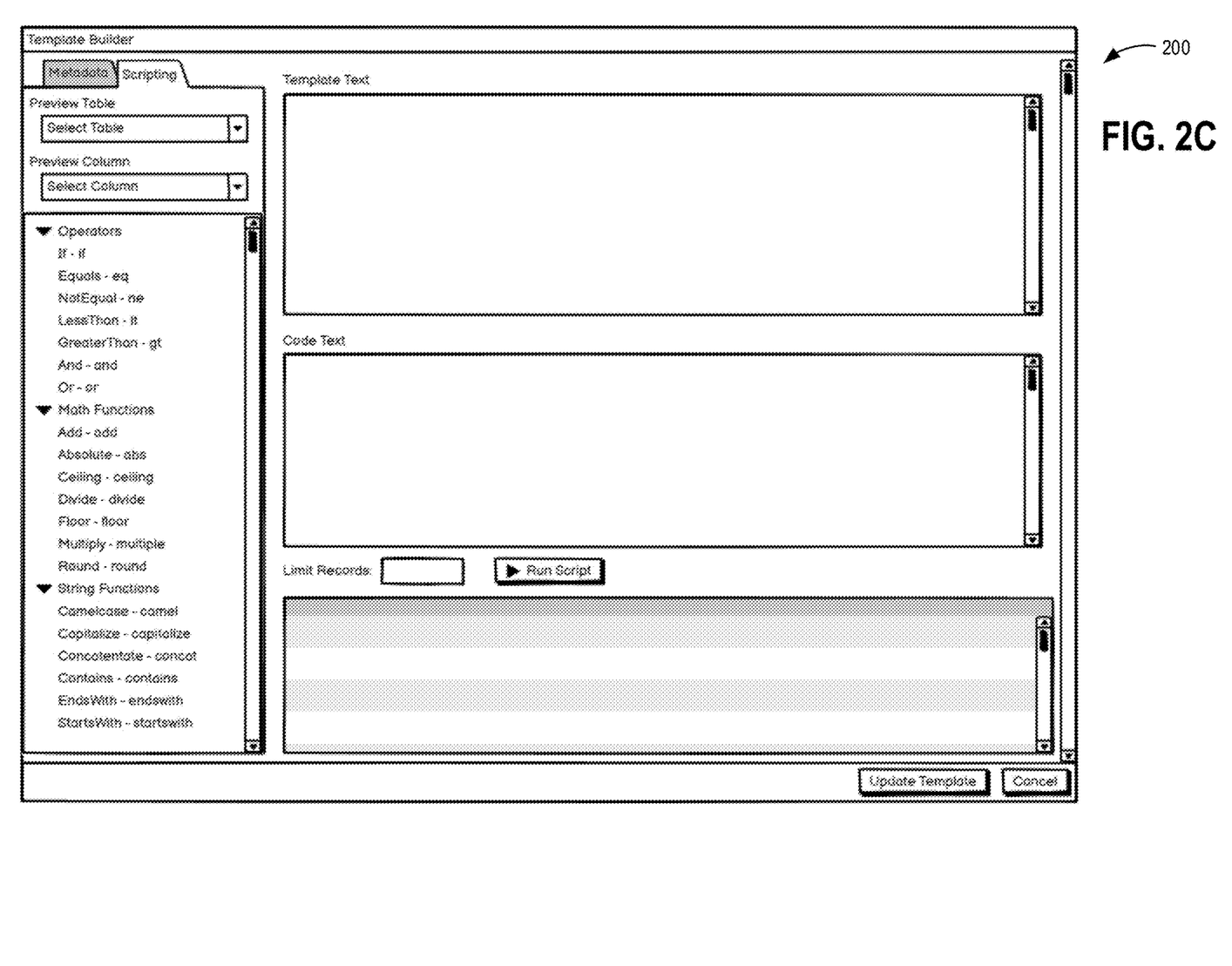
Figure 4:
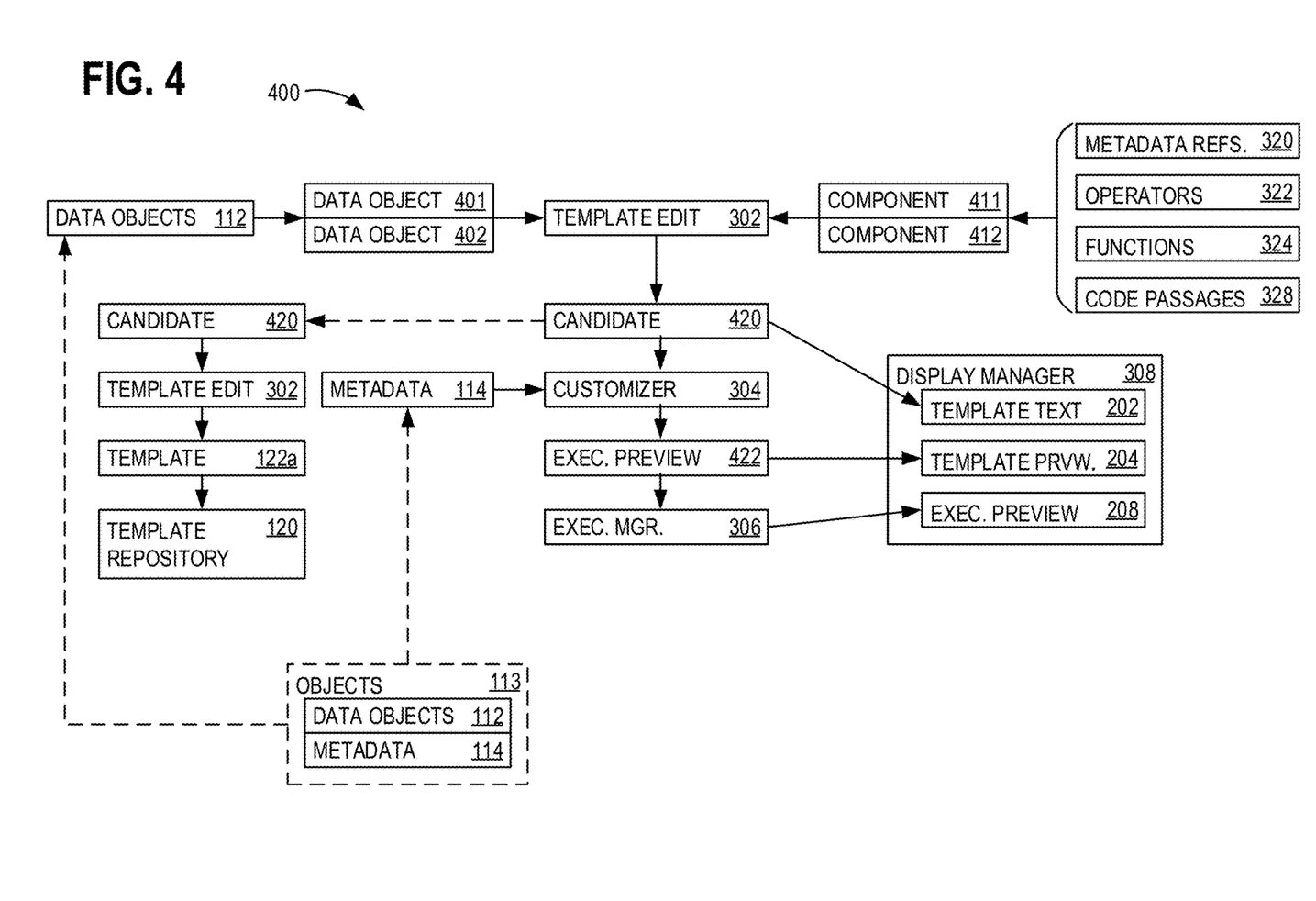
FIG. 4 illustrates an exemplary workflow that may occur when using the template builder of FIG. 1.

FIG. 2A illustrates an exemplary interface 200 for template builder 300, and FIG. 2B illustrates a clean version of interface 200 with minimal annotation. FIG. 2C illustrates a clean version of the interface 200 with the scripting tab visible to illustrate the template components that can be added to the candidate script template. Interface 200 has template text field 202 showing a candidate script template 420 (see FIG. 4), and a generated script field 204 showing a generated script preview 422. Candidate script template 420 and generated script preview 422 are shown in FIG. 4. Candidate script template 420 may be for generating any type of data processing code including but not limited to SQL and Python scripts.

The template builder allows the user 102 to select a specific data object (referred to as a "test data object") that the template builder will use to customize the candidate script template and create a generated script for preview and evaluation. This permits development and debugging of a script using real data. In some examples, test data object selection window 212 comprises a drop-down menu(s) of data objects 112 received from metadata repository 110. A selection window 206 permits user 102 to insert references to metadata from the repository 110 in the candidate script template 420.

In the illustrated example, template text field 202 shows:

select distinct UPPER("{ {column.name}}") as key,
UPPER("{ {column.name}}") as value from
"{ {schema.name}}", "{ {table.name}}"
where "{ {column.name}}"!=' ' AND "{ {column.name}}" IS NOT NULL ORDER BY 1

In this illustrated example, { {column.name}}, { {schema.name}}, and { {table.name}} are metadata references. Test data object 401 is "CUSTOMER.CONTACT", and generated script field 204 shows:

select distinct UPPER("STATE_CODE") as key, UPPER ("STATE_CODE") as value from "CUSTOMER"."CONTACT"
where "STATE_CODE"!=' ' AND "STATE_CODE" IS NOT NULL ORDER BY 1

The metadata references { {column.name}}, { {schema.name}}, and { {table.name}} are selectable from selection window 206 when metadata tab 214 is selected. Generated script preview 422, displayed in generated script field 204, is a customized version of candidate script template 420 displayed in template text field 202, in which the customization is based on the selected test data object 401, displayed in test data object selection window 212. User 102 may also manually edit template text field 202, thereby altering candidate script template 420.

When scripting tab 216 is selected (as shown in FIG. 2C), selection window 206 permits selection of template components from template component library 106. An execution button 210 permits user 102 to launch execution of generated script preview 422. The results of the execution are displayed in execution results field 208. This permits user 102 to determine whether candidate script template 420 is ready for persisting, or requires further development or debugging.

When user 102 is satisfied with candidate script template 420, user 102 can click or otherwise select a save button 218 (labeled "Update Template" to persist candidate script template 420 as an output script template, for example script template 122*a*.

Figure 3:
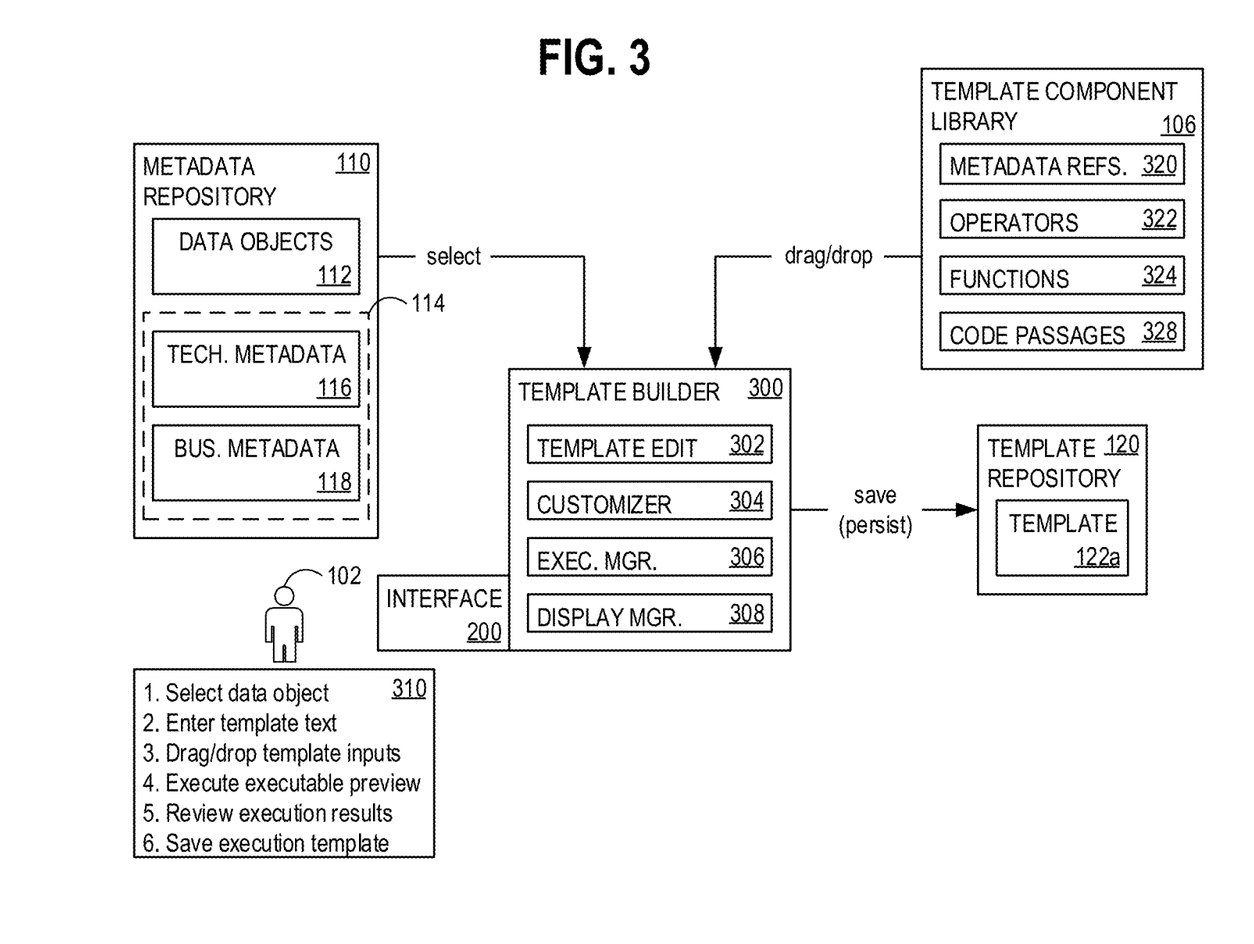
FIG. 3 illustrates data sources and outputs of the template builder of FIG. 1.

FIG. 3 illustrates data sources and outputs of template builder 300. Template builder 300 has multiple functional components, including a template editor 302, a customizer 304, an execution manager 306, and a display manager 308. Metadata repository 110 has data objects 112 and metadata 114. Metadata 114 includes technical metadata 116 and business metadata 118.

Template component library 106 includes various template components, such as metadata references 320, operators 322, functions 324, and code passages 328. During use, user 102 may initially select a starting code passage from code passages 328 to initially populate candidate script template 420, and build out candidate script template 420 further with metadata references 320, operators 322, and functions 324. The building of candidate script template 420 is performed by user 102 within template editor 302.

User 102 uses interface 200 to perform a list of tasks 310, which include: (1) Select data object; (2) Enter template text; (3) Drag/drop template components; (4) Execute generated script preview; (5) Review execution results; and (6) Save script template. The output is script templates 122*a* saved (persisted) to template repository 120.

FIG. 4 illustrates an exemplary workflow 400 that may occur when user 102 uses template builder 300, interacting with template builder 300 via interface 200. User 102 builds out candidate script template 420 by selecting various template components, such as metadata references 320, operators 322, functions 324, and code passages 328. Initially, for example, user 102 may select a starting code passage from code passages 328 as template component 411. Display manager 308 displays candidate script template 420 in template text field 202.

User 102 may then use template editor 302 to select a data object, for example initially selecting a data object 401. With a selected data object, and a candidate script template 420 with at least some components, customizer 304 customizes candidate script template 420 into execution preview 422. Display manager 308 displays execution preview 422 in generated script field 204. Customizer 304 uses metadata 114. Metadata 114 and data objects 112 together form objects 113.

Upon user 102 attempting to execute execution preview 422, execution manager 306 manages the execution and display manager 308 displays the results in execution results field 208. In some scenarios, user 102 may wish to test candidate script template 420 with a different data object. User 102 uses template editor 302 to select a second data object, such as test data object 402. Customizer 304 uses this new data object selection to customize candidate script template 420 based on test data object 402. Display manager 308 updates the display in generated script field 204, and when executed, displays the new results in execution results field 208.

When user 102 is satisfied with candidate script template 420, user 102 uses template editor 302 to persist candidate script template 420 to template repository 120 as script template 122*a*, the output script template.

Figure 5:
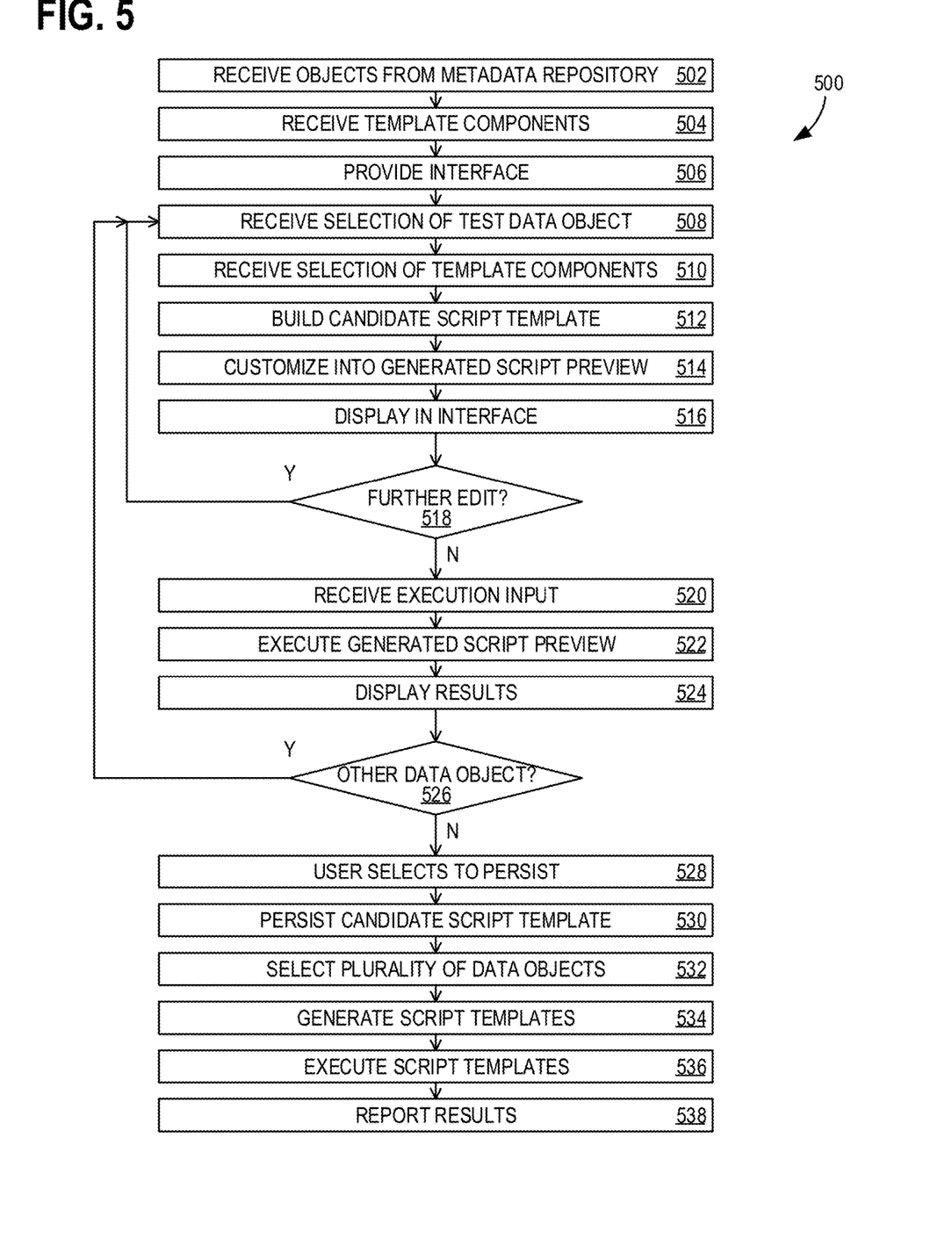
FIG. 5 illustrates a flowchart of exemplary operations associated with FIG. 1.

FIG. 5 illustrates a flowchart 500 of exemplary operations associated with arrangement 100, for example, a method of generating script template 122*a*. In some examples, script template 122*a* comprises a templated data test, such as an SQL query template, an interpreted language program template, such as a python program template, or another template. In some examples, at least a portion of flowchart 500 may be performed using one or more computing devices 700 of FIG. 7.

Flowchart 500 commences with receiving an indication of objects 113 in metadata repository 110 in operation 502. In some examples, objects 113 in metadata repository 110 comprise data objects 112, technical metadata 116, and business metadata 118. Operation 504 includes receiving an indication of template components in template component library 106. In some examples, the template components in template component library 106 comprise metadata references 320, operators 322, functions 324, and code passages 328.

Operation 506 provides interface 200 to receive selections of objects 113 (e.g., data objects 401 and 402) in metadata repository 110 and the template components (e.g., template components 411 and 412) in template component library 106. In operation 508, template builder 300 receives, through interface 200, a selection of data object 401 (a first test data object) from among objects 113 in metadata repository 110. In operation 510, template builder 300 receives, through interface 200, a selection of template component 411 (a first selected template component) from among the template components in template component library 106. Multiple template components may be selected. Template components simplify the insertion of text into candidate script template 420 for user 102, although some examples may not provide for template components.

Operation 512 builds candidate script template 420 with template component 411, and operation 514 customizes candidate script template 420 to data object 401 into generated script preview 422. Operation 516 displays, in interface 200, generated script preview 422 and candidate script template 420 in template text field 202 and generated script field 204, respectively. Operations 508 and 516 may occur in differing order, as user 102 alters selections of template components and objects. The displays of generated script preview 422 and candidate script template 420 may be updated in real-time.

In decision operation 518, user 102 determines whether further editing of candidate script template 420 is desired. If so, flowchart 500 returns to operation 508. In a subsequent pass-through operations 508-516, a different test object and different template components may be selected in operations 508 and 510. For example, operation 510 may include receiving, through interface 200, a selection of template component 412 (a second selected template component) from among the template components in template component library 106. Operation 512 and 516 revise candidate script template 420 and customize generated script preview 422 accordingly, with template component 412.

Otherwise, template builder 300 receives user input to execute generated script preview 422, for example by user 102 clicking execution button 210 in interface 200, in operation 520. In operation 522, template builder 300 executes generated script preview 422 customized to data object 401, with execution manager 306. Operation 524 displays results of the execution of generated script preview 422 in execution results field 208, in interface 200.

In decision operation 526, user 102 determines whether to test candidate script template 420 using another data object, such as data object 402. If so, flowchart 500 returns to operation 508. This time, operation 508 includes receiving, through interface 200, a selection of data object 402 (a second test data object) from among objects 113 in metadata repository 110, and operation 514 customizes candidate script template 420 to data object 402 into generated script preview 422. Also, this time, operation 522 executes generated script preview 422 customized to data object 402.

However, if user decides that candidate script template 420 is complete, user clicks save button 218 and template builder 300 receives user input to persist candidate script template 420 in operation 528. In operation 530, template builder persists candidate script template 420 as (output) script template 122a in template repository 120.

Script template 122a is now ready for use by template execution tool 130. Based on at least detecting a trigger condition, such as a scheduled test event under the control of scheduler 134 or user input, template execution tool 130 selects a plurality of data objects from among objects 113 in metadata repository 110, in operation 532. In operation 534, for each data object of the plurality of data objects, script generator 132 of template execution tool 130 generates script template 142a based on at least script template 122a. Generating script template 142a comprises customizing script template 122a to the data object of the plurality of data objects. In some examples, this may be generating an executable program based on at least script template 122a, in which the executable program comprises an SQL query or a python program.

In operation 536 template execution tool 130 executes the script templates, including script template 142a, and operation 538 reports results 160 of the executions of generated script templates 140.

Figure 6:
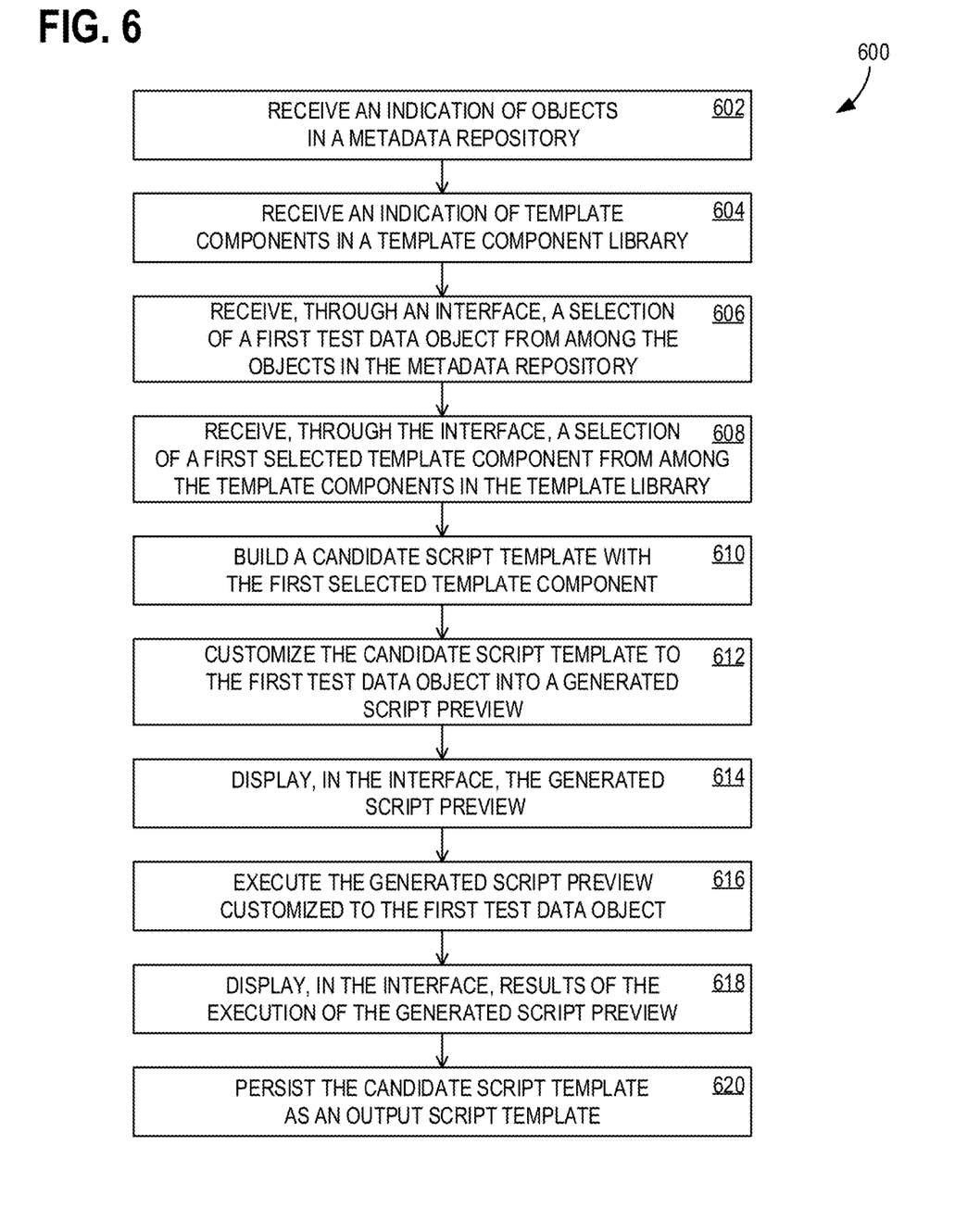
FIG. 6 illustrates another flowchart of exemplary operations associated with FIG. 1.

FIG. 6 illustrates a flowchart 600 of exemplary operations associated with arrangement 100. In some examples, at least a portion of flowchart 600 may be performed using one or more computing devices 700 of FIG. 7. Flowchart 600 commences with operation 602, which includes receiving an indication of objects in a metadata repository. Operation 604 includes receiving an indication of template components in a template component library.

Operation 606 includes receiving, through the interface, a selection of a first test data object from among the objects in the metadata repository. Operation 608 includes receiving, through the interface, a selection of a first selected template component from among the template components in the template component library. Operation 610 includes building a candidate script template with the first selected template component.

Operation 612 includes customizing the candidate script template to the first test data object into a generated script preview. Operation 614 includes displaying, in the interface, the generated script preview. Operation 616 includes executing the generated script preview customized to the first test data object. Operation 618 includes displaying, in the interface, results of the execution of the generated script preview. Operation 620 includes persisting (saving) the candidate script template as an output script template.

Figure 7:
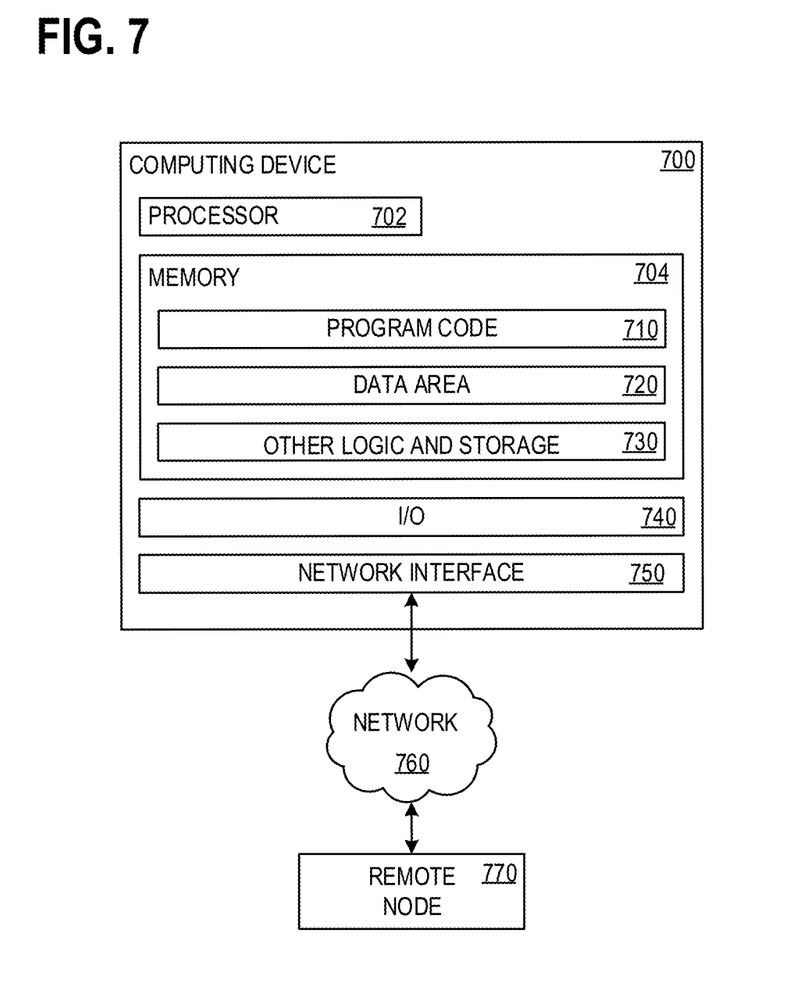
FIG. 7 illustrates a block diagram of a computing device suitable for implementing various aspects of the disclosure.

FIG. 7 illustrates a block diagram of computing device 700 that may be used as any component described herein that may require computational or storage capacity. Computing device 700 has at least a processor 702 and a memory 704 that holds program code 710, data area 720, and other logic and storage 730. Memory 704 is any device allowing information, such as computer executable instructions and/or other data, to be stored and retrieved. For example, memory 704 may include one or more random access memory (RAM) modules, flash memory modules, hard disks, solid-state disks, persistent memory devices, and/or optical disks. Program code 710 comprises computer executable instructions and computer executable components including any instructions necessary to perform operations described herein. Data area 720 holds any data necessary to perform operations described herein. Memory 704 also includes other logic and storage 730 that performs or facilitates other functions disclosed herein or otherwise required of computing device 700. An input/output (I/O) component 740 facilitates receiving input from users and other devices and generating displays for users and outputs for other devices. A network interface 750 permits communication over a network 760 with a remote node 770, which may represent another implementation of computing device 700. For example, a remote node 770 may represent another of the above-noted nodes within arrangement 100.

Additional Examples

An example method of generating a script template comprises: receiving an indication of objects in a metadata repository; receiving an indication of template components in a template component library; receiving, through an interface, a selection of a first test data object from among the objects in the metadata repository; receiving, through the interface, a selection of a first selected template component from among the template components in the template component library; building a candidate script template with the first selected template component; customizing the candidate script template to the first test data object into a generated script preview; displaying, in the interface, the generated script preview; executing the generated script preview customized to the first test data object; displaying, in the interface, results of the execution of the generated script preview; and persisting the candidate script template as an output script template.

An example system for generating a script template comprises: a processor; and a computer-readable medium storing instructions that are operative upon execution by the processor to: receive an indication of objects in a metadata repository; receive an indication of template components in a template component library; receive, through an interface, a selection of a first test data object from among the objects in the metadata repository; receive, through the interface, a selection of a first selected template component from among the template components in the template component library; build a candidate script template with the first selected template component; customize the candidate script template to the first test data object into a generated script preview; display, in the interface, the generated script preview; execute the generated script preview customized to the first test data object; display, in the interface, results of the execution of the generated script preview; and persist the candidate script template as an output script template.

One or more example computer storage devices has computer-executable instructions stored thereon, which, upon execution by a computer, cause the computer to perform operations comprising: receiving an indication of objects in a metadata repository; receiving an indication of template components in a template component library; receiving, through an interface, a selection of a first test data object from among the objects in the metadata repository; receiving, through the interface, a selection of a first selected template component from among the template components in the template component library; building a candidate script template with the first selected template component; customizing the candidate script template to the first test data object into a generated script preview; displaying, in the interface, the generated script preview; executing the generated script preview customized to the first test data object; displaying, in the interface, results of the execution of the generated script preview; and persisting the candidate script template as an output script template.

Alternatively, or in addition to the other examples described herein, examples include any combination of the following:

- based on at least detecting a trigger condition, selecting a plurality of data objects from among the objects in the metadata repository;
- for each data object of the plurality of data objects, generating an executable data test based on at least the output script template;
- for each data object of the plurality of data objects, generating an executable script based on at least the output script template;
- generating the executable script or data test comprises customizing the output script template to the data object of the plurality of data objects;
- executing the script templates;
- reporting results of the executions of the script templates;
- receiving, through the interface, a selection of a second selected template component from among the template components in the template component library;
- revising the candidate script template with the second selected template component;
- receiving, through the interface, a selection of a second test data object from among the objects in the metadata repository;
- customizing the candidate script template to the second test data object into the generated script preview;
- executing the generated script preview customized to the second test data object;
- the objects in the metadata repository comprise data objects, technical metadata, and business metadata;
- the template components in the template component library comprise metadata references, operators, functions, and code passages;
- persisting the candidate script template in a template repository;
- the script template comprises a templated data test;
- the script template comprises an interpreted language program template;
- provide the interface to receive selections of the objects in the metadata repository and the template components in the template component library;
- receiving user input to execute the generated script preview;
- receiving user input to persist the candidate script template;
- generating an executable program based on at least the script template;
- the script template comprises an SQL query template;
- the script template comprises a templated data test;
- the templated data test comprises an SQL query template;
- the executable program comprises an SQL query;
- the script template comprises an interpreted language program template;
- the interpreted language program template comprises a python program template; and
- the executable program comprises a python program.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. A method of generating a script template, the method comprising:
   receiving an indication of objects in a metadata repository;
   receiving an indication of template components in a template component library;

receiving, through an interface, a selection of a first test data object from among the objects in the metadata repository;
receiving, through the interface, a selection of a first selected template component from among the template components in the template component library;
building a candidate script template with the first selected template component;
customizing the candidate script template to the first test data object into a generated script preview;
displaying, in the interface, the generated script preview;
executing the generated script preview customized to the first test data object;
displaying, in the interface, results of the execution of the generated script preview; and
persisting the candidate script template as an output script template.

2. The method of claim 1, further comprising:
based on at least detecting a trigger condition, selecting a plurality of data objects from among the objects in the metadata repository;
for each data object of the plurality of data objects, generating a script template based on at least the script template, wherein generating the script template comprises customizing the output script template to the data object of the plurality of data objects;
executing the script templates; and
reporting results of the executions of the script templates.

3. The method of claim 1, further comprising:
receiving, through the interface, a selection of a second selected template component from among the template components in the template component library; and
revising the candidate script template with the second selected template component.

4. The method of claim 1, further comprising:
receiving, through the interface, a selection of a second test data object from among the objects in the metadata repository;
customizing the candidate script template to the second test data object into the generated script preview; and
executing the generated script preview customized to the second test data object.

5. The method of claim 1, wherein the objects in the metadata repository comprise data objects, technical metadata, and business metadata, and wherein the template components in the template component library comprise metadata references, operators, functions, and code passages.

6. The method of claim 1, wherein script template comprises an SQL query template.

7. The method of claim 1, wherein the script template comprises an interpreted language program template.

8. A system for generating a script template, the system comprising:
a processor; and
a computer-readable medium storing instructions that are operative upon execution by the processor to:
receive an indication of objects in a metadata repository;
receive an indication of template components in a template component library;
receive, through an interface, a selection of a first test data object from among the objects in the metadata repository;
receive, through the interface, a selection of a first selected template component from among the template components in the template component library;
build a candidate script template with the first selected template component;
customize the candidate script template to the first test data object into a generated script preview;
display, in the interface, the generated script preview;
execute the generated script preview customized to the first test data object;
display, in the interface, results of the execution of the generated script preview; and
persist the candidate script template as an output script template.

9. The system of claim 8, wherein the instructions are further operative to:
based on at least detecting a trigger condition, select a plurality of data objects from among the objects in the metadata repository;
for each data object of the plurality of data objects, generate a script template based on at least the script template, wherein generating the script template comprises customizing the output script template to the data object of the plurality of data objects;
execute the script templates; and
report results of the executions of the script templates.

10. The system of claim 8, wherein the instructions are further operative to:
receive, through the interface, a selection of a second selected template component from among the template components in the template component library; and
revise the candidate script template with the second selected template component.

11. The system of claim 8, wherein the instructions are further operative to:
receive, through the interface, a selection of a second test data object from among the objects in the metadata repository;
customize the candidate script template to the second test data object into the generated script preview; and
execute the generated script preview customized to the second test data object.

12. The system of claim 8, wherein the objects in the metadata repository comprise data objects, technical metadata, and business metadata, and wherein the template components in the template component library comprise metadata references, operators, functions, and code passages.

13. The system of claim 8, wherein script template comprises an SQL query template.

14. The system of claim 8, wherein the script template comprises an interpreted language program template.

15. One or more computer storage devices having computer-executable instructions stored thereon, which, upon execution by a computer, cause the computer to perform operations comprising:
receiving an indication of objects in a metadata repository;
receiving an indication of template components in a template component library;
receiving, through an interface, a selection of a first test data object from among the objects in the metadata repository;
receiving, through the interface, a selection of a first selected template component from among the template components in the template component library;
building a candidate script template with the first selected template component;
customizing the candidate script template to the first test data object into a generated script preview;

displaying, in the interface, the generated script preview;
executing the generated script preview customized to the first test data object;
displaying, in the interface, results of the execution of the generated script preview; and
persisting the candidate script template as an output script template.

16. The one or more computer storage devices of claim 15, wherein the operations further comprise:
based on at least detecting a trigger condition, selecting a plurality of data objects from among the objects in the metadata repository;
for each data object of the plurality of data objects, generating a script template based on at least the script template, wherein generating the script template comprises customizing the output script template to the data object of the plurality of data objects;
executing the script templates; and
reporting results of the executions of the script templates.

17. The one or more computer storage devices of claim 15, wherein the operations further comprise:
receiving, through the interface, a selection of a second selected template component from among the template components in the template component library; and
revising the candidate script template with the second selected template component.

18. The one or more computer storage devices of claim 15, wherein the operations further comprise:
receiving, through the interface, a selection of a second test data object from among the objects in the metadata repository;
customizing the candidate script template to the second test data object into the generated script preview; and
executing the generated script preview customized to the second test data object.

19. The one or more computer storage devices of claim 15, wherein the objects in the metadata repository comprise data objects, technical metadata, and business metadata, and wherein the template components in the template component library comprise metadata references, operators, functions, and code passages.

20. The one or more computer storage devices of claim 15, wherein the script template comprises an SQL query template or an interpreted language program template.

* * * * *